UNITED STATES PATENT OFFICE.

WILLIAM B. JACKSON, OF TACOMA, WASHINGTON.

PROCESS OF CONCENTRATING FRUIT-JUICES.

981,860.    Specification of Letters Patent.    Patented Jan. 17, 1911.

No Drawing.    Application filed December 26, 1908. Serial No. 469,329.

*To all whom it may concern:*

Be it known that I, WILLIAM B. JACKSON, a citizen of the United States, residing at Tacoma, in the county of Pierce and State of Washington, have invented certain new and useful Improvements in Processes of Concentrating Fruit-Juices; and I do hereby declare the following to be a full, clear, and exact description of the invention, such as will enable others skilled in the art to which it appertains to make and use the same.

The invention relates to a process of concentrating fruit juices, being applicable to all kinds of fruit juices, and sugar-cane, and beet, and all other juices and liquids or fluids containing sugar or saccharine matter, and further, it may be employed also in the reduction of the volume of milk and other liquids and fluids.

The object of the invention is to obtain a process by which the volume of liquid is greatly reduced, and quality improved, while the essential oils or flavors primarily belonging to the juices are retained, and will remain unchanged, thus making it of great utility and value in tropical and other countries where certain fruits are not produced, and where such concentrated juices, having their natural flavor, are very valuable.

Briefly, the invention consists in subjecting the juice to a temperature considerably below freezing, in which condition the watery portion will be in the form of ice, while the purer and undiluted juice remains in liquid form. This is then drawn off. During the process of freezing, considerable amount of the concentrated juice is imprisoned in the ice, where numerous small cells are to be found, and my invention contemplates also, the recovering of this portion of the original juice, and this is accomplished by placing the ice in a rapidly revolving centrifugal machine, cylinder or the like, so that the juice will be thrown out of the ice after said ice is sufficiently broken. The juice being thus liberated is permitted to run from the machine and be collected in any suitable receptacle.

In processes of this character, it has been a common proceeding to subject fruit juices to evaporation, either by solar or artificial heat, in order to obtain the best and most desirable qualities of the liquids and retain in such concentrated form all of the essential oils and flavors. In the present process, the liquids are subjected to a temperature varying as required from 32 degrees above zero F. to 50 and more degrees below zero F., as the circumstances may make necessary. This freezing action is carried on in any suitable room or apartment, by the usual refrigerating machinery, and in this room are contained vats, cans, or cylinders of any convenient shape, and of any desirable material, the juices being placed in said receptacles. In some instances, it may be found desirable to rotate, or give other motion to the liquid containing receptacles, although this is not always necessary.

After the cold temperature has had the requisite action upon the liquids, all of the watery matter having been transformed into ice, the residue or concentrated fluid is drawn off as the commercial product. It has been found, however, that the ice resulting from the process contains a great deal of the concentrated juices within its inner cells, and in order to prevent the loss of this portion, the ice is broken or crushed and placed in a rapidly revolving, horizontal or perpendicular, centrifugally operating receptacle. The cylinder may be given anywhere from five hundred to fifteen hundred revolutions a minute, so as to give the best results obtainable, and during the rotation of the receptacle, any desirable fluid remaining in the ice is thrown out, the ice being sufficiently broken. This latter step of the process must be carried on in the cold room, although not necessarily so cold as the freezing room, the purpose being to prevent any melting action of the ice.

It will be obvious that the invention as here described, is susceptible of certain changes and modifications, without departing from the essential idea therein involved, namely, the subjecting of fruit or other juices to a temperature considerably below freezing whereby to form ice of the water in the juices, permitting the concentrated juice to flow from the ice thus formed, and then breaking up the ice and placing it in a rapidly revolving cylinder or other receptacle to recover whatever portions of the concentrated juice may be retained within the cells of the ice formation.

What I claim and desire to secure by Letters-Patent is:—

The process of concentrating liquids which consists in subjecting the same to a temperature considerably below freezing, first separating the concentrated portion from the liquid, and subsequently removing the remaining portions contained within the ice by crushing the same and subjecting said ice to centrifugal action.

In testimony whereof, I affix my signature, in the presence of two subscribing witnesses.

WILLIAM B. JACKSON.

Witnesses:
M. D. WOOLF,
W. H. DOOLITTLE.